A. E. HARPER & H. H. RIGGS.
FILM CAMERA.
APPLICATION FILED APR. 13, 1911.

1,073,982.

Patented Sept. 23, 1913.

WITNESSES

INVENTORS
Arthur E. Harper
Henry H. Riggs
BY Munn & Co.
ATTORNEYS ly pointed out in the appended
UNITED STATES PATENT OFFICE.

ARTHUR E. HARPER, OF NEWARK, NEW JERSEY, AND HENRY H. RIGGS, OF HYDE PARK, MASSACHUSETTS.

FILM-CAMERA.

1,073,982.   Specification of Letters Patent.   Patented Sept. 23, 1913.

Application filed April 13, 1911. Serial No. 620,801.

*To all whom it may concern:*

Be it known that we, ARTHUR E. HARPER, a resident of Newark, in the county of Essex and State of New Jersey, and HENRY H.
RIGGS, a resident of Hyde Park, in the county of Norfolk and State of Massachusetts, both citizens of the United States, have invented a new and Improved Film-Camera, of which the following is a full, clear, and exact description.

Our invention relates to an improvement in cameras, and more particularly to a film camera.

An object of our invention is to so arrange the exposure opening adjacent the film that when desired only a portion of the film may be exposed.

A further object of our invention is to permit the unwinding of the film from the forward spool without causing sagging or rumpling of the film.

With the above and other objects in view, as will more fully hereinafter appear, the present invention consists in certain novel details of construction and arrangement of parts hereinafter fully described, illustrated in the accompanying drawings, and more particularly pointed out in the appended claims.

Reference is to be had to the accompanying drawings, forming a part of this specification, in which similar characters of reference indicate corresponding parts in both the figures, and in which—

Figure 1:
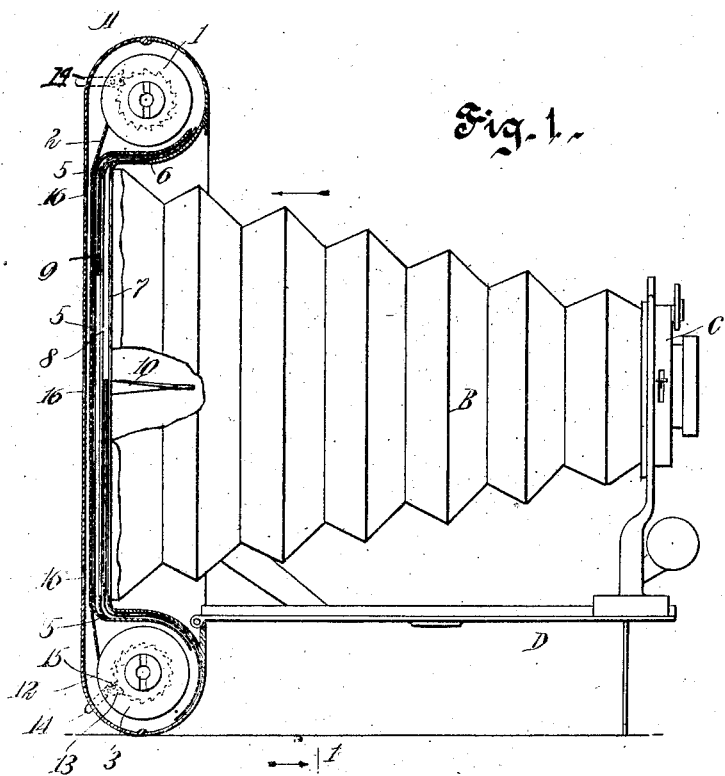
Figure 2:
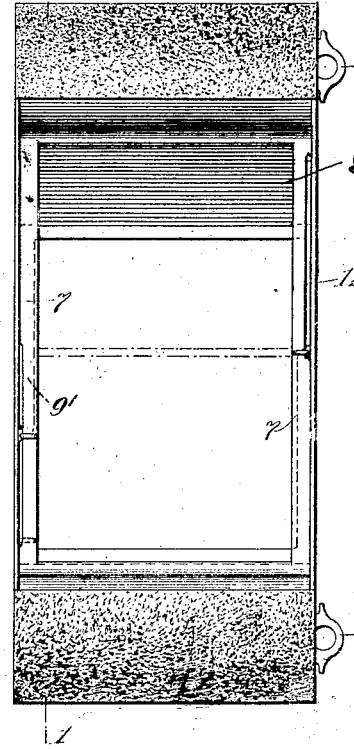

Figure 1 is a vertical sectional view showing a preferred embodiment of our invention applied to a camera, and taken on the line 1—1 of Fig. 2, looking in the direction of the arrow; and Fig. 2 is a plan view of the device shown in Fig. 1, with the bellows and adjacent parts removed, and looking in the direction of the arrow.

In the drawings we have shown a common form of camera, comprising a casing A, bellows B, lens attachments C, and combined cover and stand D, all of the ordinary construction. In the casing A is mounted and adapted to rotate therein, the take-up spool 1, carrying one end of a movable film 2, which is unreeled from the supply spool 3. These spools are actuated by means of a winding key 4 attached to the axle of each of the spools and projecting outside of the casing A. This moving film travels across an exposure frame 5 having an exposure opening therein.

The front portion of the casing A is curved about the spools 1 and 3, as shown at 6, and is then stretched across the front of the camera to form a frame 7 constituting the bellows opening of the camera, said front portion extending in front of and spaced a short distance from the frame 5. Positioned between the frames 7 and 5, is an intermediate frame 8 having an opening 65 corresponding to the openings in the aforementioned frames, which frames constitute two parallel disposed guideways, into each of which guideways is positioned a movable shutter 9 of any suitable material, preferably opaque celluloid, the inner end of each of which shutters is reinforced by a transverse metal strip with a forwardly-projecting extension 9', the end of which is bent inwardly to form a sliding tongue 10 movable in slots 11 in the opposite sides of the frame 7. The outer end of each of the diaphragms or shutters 9 is preferably made flexible in order to fit in the ends of the casing A between the outer frame and the revolving spools 1 and 3.

It will be seen by this arrangement that the opening to the film may be of an extent to take in the whole portion of the film which is unreeled, or either one or both of the shutters 9 may be drawn toward the center of the exposure opening to limit the size of the exposed surface or to place the picture on one or the other half of the unreeled portion of the film or in any other position on this unreeled portion.

Ordinarily it cannot be ascertained when using the film and setting it for another exposure, whether or not the entire surface is needed, and in case it is desired to use but a portion of this film after it has been set for the full opening, it is necessary to rewind part of the exposed film back on the supply spool. To do this, and, at the same time, to keep the film taut and to prevent sagging of the same, there is positioned on each of the spools, a ratchet 12, shown in dotted lines in Fig. 1, which is engaged by a pawl 13, which is so arranged as to permit a forward unreeling of the film. In order to unlock the spool to roll the film backward, there is projected from each end of the camera, the end of a lever 14, having a pin 15 shown in dotted lines in Fig. 1, which engages the pawl to throw it out of engagement with the ratchet; then by means of the winding key 4 as much of the film as is found necessary may be drawn back on the supply spool. In order to determine how much of the film has been drawn back, there is positioned in the rear of the casing A, a series of apertures 16, disposed across the back of the camera, so that by this arrangement, it is possible to identify the location of each portion of the film by the numbers which are customarily printed on the backs of films in common use.
Many changes could be made in the above construction and many apparently widely different embodiments of this invention could be made without departing from the scope thereof. It is intended that all matters contained herein, in the above description, or shown in the accompanying drawings shall be interpreted as illustrative and not in a limiting sense. It is also to be understood that the language used in the following claims is merely intended to cover all the generic and specific features of the invention herein described and all statements of the scope of the invention, which, as a matter of language, might be said to fall therebetween, and that materials, sizes and relativities of parts are non-essential, except as called for in the claims.

Having thus described our invention, we claim as new and desire to secure by Letters Patent:

1. In a camera, the combination of a casing provided with spool holders and with a relatively thin portion located between said spool holders, a bellows secured to said thin portion and extending between said spool holders, a plurality of shutters slidably mounted within said thin portion, and movable independently of each other, and means controllable at the will of the operator for shifting said shutters independently of each other in relation to said thin portion of said casing.

2. In a camera, the combination of a casing provided with rounded walls forming housings for spools, a frame located within said casing and provided with rounded portions mating the curvature of said rounded walls and spaced therefrom, and a pair of shutters slidably mounted within said casing and provided with flexible portions extending between said rounded walls and the adjacent rounded portions of said frame for guiding said shutters partially in curved paths, and means for shifting relative positions of said shutters.

3. The combination of a casing provided with a spool holder having a curved wall, said casing being further provided with an opening for exposing a film, a frame having an opening registering with said opening in said casing, said frame having curved portions disposed adjacent to said curved wall and spaced therefrom, and a flexible shutter slidably mounted within said casing and provided with a portion extending between said curved wall and the adjacent portion of said frame.

4. In a camera, the combination of a casing provided with a passage-way a portion of which is curved, said casing being further provided with an opening registering with said passage-way, a frame provided with an opening registering with said passage-way, said frame being provided further with a portion curved to mate the curvature of said wall, and a shutter slidably mounted within said casing and adapted to close said openings, said shutter being provided with a portion extending between said curved wall and the adjacent curved portion of said frame.

5. In a camera, the combination of a casing provided with an exposure opening and with a slideway disposed adjacent to said exposure opening, said slideway having a curved portion and a flexible shutter mounted within said slideway for the purpose of partially closing said exposure opening, said shutter being provided with a portion extending into said curved portion of said slideway.

6. In a camera, the combination of a casing provided with a spool holder having a curved wall, said casing being further provided with an exposure opening and with a slideway, a frame carried by said camera and provided with a curved portion disposed adjacent to said curved portion of said spool holder and spaced therefrom, and a flexible shutter located between said frame and the adjacent portion of said casing, said shutter having a portion extending between the curved portion of said spool holder and the adjacent curved portion of said frame.

In testimony whereof I have signed my name to this specification in the presence of two subscribing witnesses.

ARTHUR E. HARPER.

Witnesses:
 W. N. MASTERSON
 W. E. D. WARD.

In testimony whereof I have signed my name to this specification in the presence of two subscribing witnesses.

HENRY H. RIGGS.

Witnesses:
 W. S. ORTON,
 PHILIP D. ROLLHAUS.